United States Patent
Jin et al.

(10) Patent No.: US 9,025,822 B2
(45) Date of Patent: May 5, 2015

(54) SPATIALLY COHERENT NEAREST NEIGHBOR FIELDS

(71) Applicant: Adobe Systems Incorporated, San Jose, CA (US)

(72) Inventors: Hailin Jin, San Jose, CA (US); Zhuoyuan Chen, Evanston, IL (US); Zhe Lin, Fremont, CA (US); Scott D. Cohen, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 154 days.

(21) Appl. No.: 13/794,125

(22) Filed: Mar. 11, 2013

(65) Prior Publication Data

US 2014/0254933 A1    Sep. 11, 2014

(51) Int. Cl.
*G06K 9/00* (2006.01)
*G06K 9/46* (2006.01)

(52) U.S. Cl.
CPC .................... *G06K 9/4642* (2013.01)

(58) Field of Classification Search
USPC ........... 382/103, 107, 236, 278; 348/154, 169
See application file for complete search history.

(56) References Cited

U.S. PATENT DOCUMENTS

| | | | |
|---|---|---|---|
| 5,351,095 A | 9/1994 | Kerdranvat | |
| 5,729,008 A | 3/1998 | Blalock et al. | |
| 5,749,073 A | 5/1998 | Slaney | |
| 7,711,180 B2 * | 5/2010 | Ito et al. | 382/154 |
| 8,205,148 B1 | 6/2012 | Sharpe et al. | |
| 8,290,294 B2 | 10/2012 | Kopf et al. | |
| 8,340,461 B2 | 12/2012 | Sun et al. | |
| 8,346,751 B1 * | 1/2013 | Jin et al. | 707/708 |
| 8,588,551 B2 | 11/2013 | Joshi et al. | |
| 8,675,962 B2 | 3/2014 | Mori et al. | |
| 2004/0218834 A1 * | 11/2004 | Bishop et al. | 382/299 |
| 2005/0069207 A1 | 3/2005 | Zakrzewski et al. | |
| 2006/0147087 A1 | 7/2006 | Goncalves et al. | |
| 2007/0242900 A1 | 10/2007 | Chen et al. | |
| 2007/0273653 A1 | 11/2007 | Chen et al. | |

(Continued)

OTHER PUBLICATIONS

Barnes, et al., "PatchMatch: A Randomized Correspondence Algorithm for Structural Image Editing", ACM SIGGRAPH 2009 Papers (New Orleans, Louisiana, Aug. 3-7, 2009), Aug. 3, 2009, 11 pages.

(Continued)

*Primary Examiner* — Chan Park
*Assistant Examiner* — Eueng-Nan Yeh
(74) *Attorney, Agent, or Firm* — Wolfe-SBMC

(57) ABSTRACT

In embodiments of spatially coherent nearest neighbor fields, initial matching patches of a nearest neighbor field can be determined at image grid locations of a first digital image and a second digital image. Spatial coherency can be enforced for each matching patch in the second digital image with reference to respective matching patches in the first digital image based on motion data of neighboring matching patches. A multi-resolution iterative process can then update each spatially coherent matching patch based on overlapping grid regions of the matching patches that are evaluated for matching regions of the first and second digital images. An optimal, spatially coherent matching patch can be selected for each of the image grid locations of the first and second digital images based on iterative interaction to enforce the spatial coherency of each matching patch and the multi-resolution iterative process to update each spatially coherent matching patch.

20 Claims, 7 Drawing Sheets

(56) References Cited

U.S. PATENT DOCUMENTS

| | | | |
|---|---|---|---|
| 2008/0278584 A1 | 11/2008 | Shih et al. | |
| 2009/0110076 A1 | 4/2009 | Chen | |
| 2009/0297059 A1 | 12/2009 | Lee et al. | |
| 2010/0272311 A1 | 10/2010 | Nir et al. | |
| 2011/0026596 A1* | 2/2011 | Hong | 375/240.16 |
| 2011/0043603 A1 | 2/2011 | Schechner et al. | |
| 2012/0027295 A1 | 2/2012 | Shao | |
| 2012/0105728 A1* | 5/2012 | Liu | 348/607 |
| 2012/0151320 A1 | 6/2012 | McClements, IV | |
| 2013/0136364 A1 | 5/2013 | Kobayashi | |
| 2013/0230247 A1 | 9/2013 | Schlosser et al. | |
| 2013/0235201 A1 | 9/2013 | Kiyohara et al. | |
| 2014/0133675 A1 | 5/2014 | King et al. | |
| 2014/0205141 A1 | 7/2014 | Gao et al. | |
| 2014/0254881 A1 | 9/2014 | Jin | |
| 2014/0254882 A1 | 9/2014 | Jin | |
| 2014/0254943 A1 | 9/2014 | Jin | |

OTHER PUBLICATIONS

Barnes, et al., "The Generalized PatchMatch Correspondence Algorithm", European Conference on Computer Vision, Sep. 2010, Retrieved from <http://gfx.cs.princeton.edu/pubs/Barnes_2010_TGP/generalized_pm.pdf> on Sep. 9, 2010, Sep. 2010, 14 pages.

Brox, et al., "Large Displacement Optical Flow: Descriptor Matching in Variational Motion Estimation", IEEE Transactions on Pattern Analysis and Machine Intelligence, 2010, 2011, 14 pages, (published prior this application Mar. 2013).

Fattal, "Single Image Dehazing", presented at the ACM SIGGRAPH, Los Angeles, California, 2008., 9 pages, (published prior this application Mar. 2013).

He, et al., "Computing Nearest-Neighbor Fields via Propagation-Assisted KD-Trees", CVPR 2012, 2012, 8 pages, (published prior this application Mar. 2013).

He, et al., "Single Image Haze Removal Using Dark Channel Prior", In Computer Vision and Pattern Recognition, IEEE Conference on, 2009, 2009, 8 pages, (published prior this application Mar. 2013).

He, et al., "Statistics of Patch Offsets for Image Completion", ECCV 2012, 2012, 14 pages, (published prior this application Mar. 2013).

Korman, et al., "Coherency Sensitive Hashing", ICCV 2011, 2011, 8 pages, (published prior this application Mar. 2013).

Olonetsky, et al., "TreeCANN—k-d tree Coherence Approximate Nearest Neighbor algorithm", European Conference on Computer Vision, 2012, 14 pages, (published prior this application Mar. 2013).

Xu, et al., "Motion Detail Preserving Optical Flow Estimation", IEEE Transactions on Pattern Analysis and Machine Intelligence, 34(9), 2012, 8 pages, (published prior this application Mar. 2013).

"Non-Final Office Action", U.S. Appl. No. 13/675,844, Dec. 19, 2014, 10 pages.

"Non-Final Office Action", U.S. Appl. No. 13/794,408, Sep. 10, 2014, 14 pages.

Zhang, et al., "Video Dehazing with Spatial and Temporal Coherence", The Visual Computer: International Journal of Computer Graphics—CGI'2011 Conference, vol. 27, Issue 6-8, Apr. 20, 2011, 9 pages.

"Non-Final Office Action", U.S. Appl. No. 13/794,219, Feb. 12, 2015, 28 pages.

"Non-Final Office Action", U.S. Appl. No. 13/794,300, Mar. 11, 2015, 18 pages.

"Notice of Allowance", U.S. Appl. No. 13/794,408, Feb. 4, 2015, 7 pages.

Dong, et al.,' "Adaptive Object Detection and Visibility Improvement in Foggy Image", Journal of Multimedia, vol. 6, No. 1 (2011), Feb. 14, 2011, 8 pages.

"Fish Detection in Underwater Video of Benthic Habitats in Virgin Islands", University of Miami, May 29, 2012, 72 pages.

* cited by examiner

SPATIALLY COHERENT NEAREST NEIGHBOR FIELDS

BACKGROUND

Matching patches between two images, or between regions of the images, is also referred to as computing a nearest neighbor field and is a common technique used for image processing and computer graphics applications. Patches of an image may be compared as each pixel of the image, or may be a larger region of the image that includes a grid of multiple pixels. One technique for determining matching patches between two images is to exhaustively search for the best matching patch in one of the images for every patch in the other image. Although this technique is a simple algorithm, it is computationally expensive and time-consuming.

There are other more efficient algorithms that can be utilized to speed up the matching process, such as by utilizing a spatial constraint that adjacent patches in one image tend to have the same spatial relationship with the matching patches in the other image. However, these algorithms are directed to reconstructing one image from the other and often produce patch matches that are spatially incoherent, with the resulting nearest neighbor fields being based on reconstruction errors. Conventional techniques and algorithms to compute nearest neighbor fields between images do not enforce spatial coherency of the matching patches, and may not match a patch in one image to the respective, same patch in another image. For example, a white color patch in one image may be matched to any number of white color patches in another image without maintaining the spatial coherency of the actual corresponding patches in the two images.

Optical flow is the problem of inferring the apparent motion between images, and conventional algorithms for optical flow are utilized to compute a motion field, such as for optical flow registration, which is useful for image tracking, motion segmentation, and other motion processing applications. A nearest neighbor field typically provides only a very noisy estimate of the true optical flow field for the images. A motion field can be computed between two images, where the direction and magnitude of optic flow at each location is represented by the direction and length of arrows in the motion field. A motion determination between images can be utilized to track object motion, such as in video frames. For example, in a robotics application, cameras may capture two or more separate images of a scene and/or subject from slightly different perspectives and combine the separate images into one image to reduce or eliminate noise in the images. The noise effect will be different in each of the images, and the combined image is a smoothed combination of the separate images that reduces or eliminates the noise effect of each image.

Although optical flow algorithms can enforce the spatial coherency of pixels and/or patches between images, the conventional algorithms assume that the pixel motion of objects (e.g., object displacement) from one image to the next is very small. Additionally, the conventional algorithms often produce incorrect results because they are initialized to start from an initial motion field that is typically set to zero everywhere, and therefore cannot account for a large motion between two images.

SUMMARY

This Summary introduces features and concepts of spatially coherent nearest neighbor fields, which is further described below in the Detailed Description and/or shown in the Figures. This Summary should not be considered to describe essential features of the claimed subject matter, nor used to determine or limit the scope of the claimed subject matter.

Spatially coherent nearest neighbor fields is described. In embodiments, initial matching patches of a nearest neighbor field can be determined at image grid locations of first and second digital images. Spatial coherency can be enforced for each matching patch in the second digital image with reference to respective matching patches in the first digital image based on motion data of neighboring matching patches. A multi-resolution iterative process can then update each spatially coherent matching patch based on overlapping grid regions of the matching patches that are evaluated for matching regions of the first and second digital images. An optimal, spatially coherent matching patch can be selected for each of the image grid locations of the first and second digital images based on iterative interaction to enforce the spatial coherency of each matching patch and the multi-resolution iterative process to update each spatially coherent matching patch.

In embodiments, a first image grid can be created from the first digital image, a second image grid can be created from of the second digital image, and patches in the first and second image grids compared to determine the initial matching patches of the nearest neighbor field. The spatial coherency of each matching patch can be enforced based on neighboring matching patches that have similar motion data, and neighboring matching patches that have dissimilar motion data are disregarded. A motion field can be determined for each matching patch based on the motion data of the neighboring matching patches effective to enforce the spatial coherency of each matching patch. In the multi-resolution iterative process, the overlapping grid regions are evaluated for larger matching regions of the first and second digital images down to smaller matching regions of the first and second digital images. The region patch matches between the first and second digital images for each of the overlapping grid regions are determined based on a constraint that, for a larger matching region, the smaller matching regions within the larger matching region are considered to be matching.

BRIEF DESCRIPTION OF THE DRAWINGS

Embodiments of spatially coherent nearest neighbor fields are described with reference to the following Figures. The same numbers may be used throughout to reference like features and components that are shown in the Figures.

DETAILED DESCRIPTION

Figure 1:
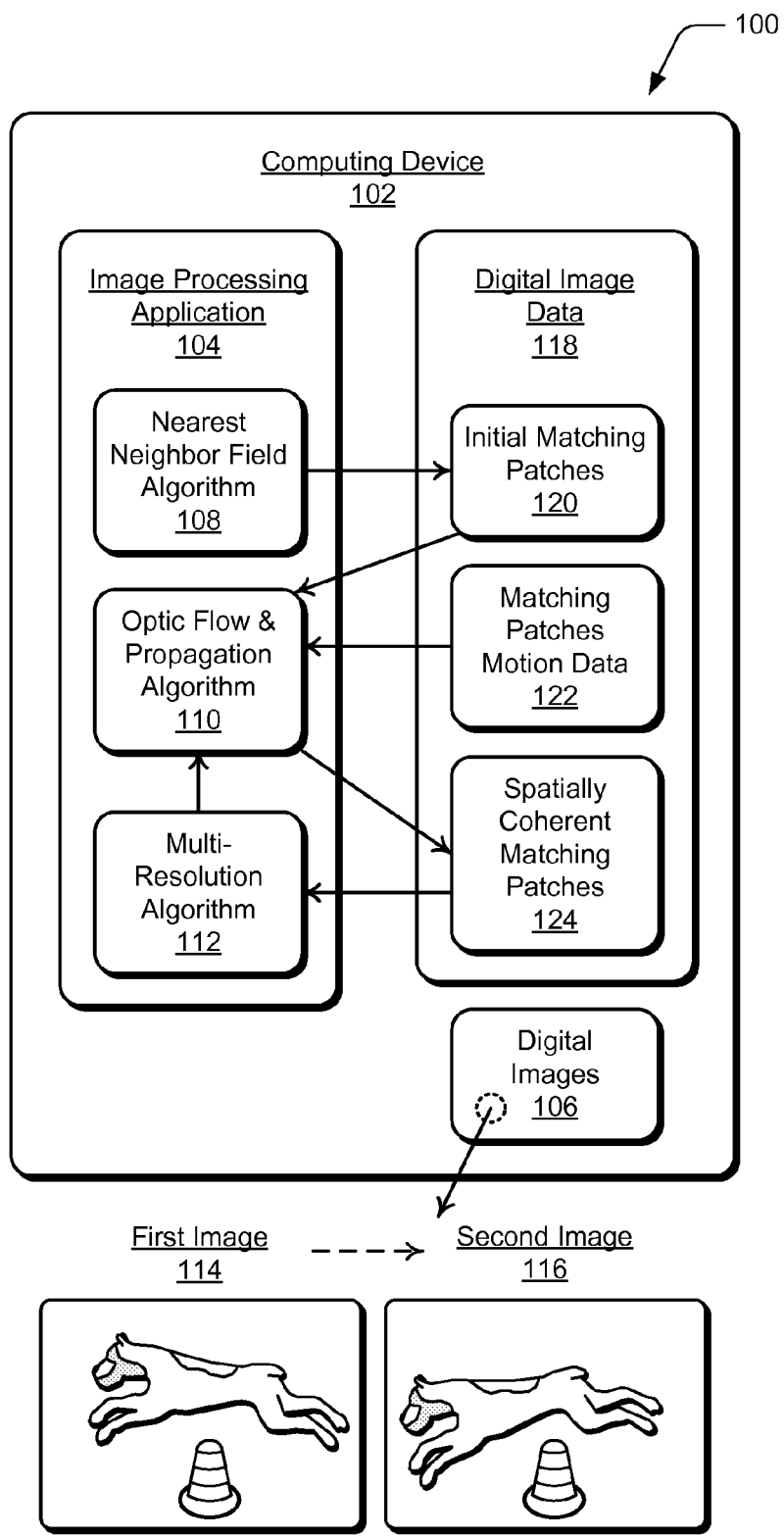
FIG. 1 illustrates an example system in which embodiments of spatially coherent nearest neighbor fields can be implemented.

Embodiments of spatially coherent nearest neighbor fields are described and may be implemented by any type of device that supports image processing, such as a computer, a server, or other type of processing device. An image processing application includes a nearest neighbor field algorithm to determine initial matching patches of a nearest neighbor field for two digital images. The initial matching patches between the two images can then be used to compute a motion field between the two images. Unlike the conventional optic flow algorithms noted above that do not account for large motion between two images, and that are initialized to start from a zero motion field, the initial matching patches of the nearest neighbor field for the two digital images are not constrained by the magnitude of the motion between the two images.

An optic flow and propagation algorithm of the image processing application can then determine a motion field for each of the initial matching patches of the nearest neighbor field based on motion data of neighboring matching patches, which again, are not constrained by the initial setting of zero motion, and large motions can therefore be accounted for from one image to the next. The motion field determinations for each of the initial matching patches based on the motion data of respective neighboring matching patches is an iterative process that enforces the spatial coherency of each matching patch in one image with reference to respective matching patches in the other image. Together, these spatially coherent matching patches form a spatially coherent nearest neighbor field for the two digital images.

Further, a multi-resolution algorithm of the image processing application implements a multi-resolution iterative process to update each spatially coherent matching patch based on overlapping grid regions of the matching patches that are evaluated for matching regions of the two digital images. For each spatially coherent matching patch, overlapping grid regions are created around the matching patch, and each of the overlapping grid regions include some number of matching patches. Increasingly larger grid regions encompass smaller grid regions with reference to the spatially coherent matching patch that all of the overlapping grid regions encompass. The multi-resolution process is an iterative feedback to the optic flow and propagation algorithm to further update and smooth the spatially coherent matching patches of the two digital images. The image processing application can then select an optimal, spatially coherent matching patch at each location of the digital images, which represents the spatially coherent nearest neighbor field for the two digital images.

While features and concepts of spatially coherent nearest neighbor fields can be implemented in any number of different devices, systems, networks, environments, and/or configurations, embodiments of spatially coherent nearest neighbor fields are described in the context of the following example devices, systems, and methods.

FIG. 1 illustrates an example system 100 in which embodiments of spatially coherent nearest neighbor fields can be implemented. The system 100 includes an example computing device 102 that includes an image processing application 104, which may implement various algorithms to generate nearest neighbor fields that are spatially coherent when processing digital images 106. The example device may be any type of computer and/or processing device, and can be implemented with various components, such as a processing system and memory, as well as with any number and combination of differing components as further described with reference to the example device shown in FIG. 7.

In this example system, the image processing application 104 includes a nearest neighbor field algorithm 108, an optic flow and propagation algorithm 110, and a multi-resolution algorithm 112 to implement embodiments of spatially coherent nearest neighbor fields. Although shown and described as separate algorithms of the image processing application, any one or more of the algorithms may be implemented together and/or independent of the image processing application. Alternatively, the image processing application 104 may be implemented without the algorithms, yet generally be implemented to perform the functions and operations of the algorithms.

The image processing application 104 and the various algorithms can be implemented as a software application, modules, or components for image processing, and can be maintained at the computing device 102 as executable instructions that are stored on computer-readable storage media, such as any suitable memory device or electronic data storage. Additionally, the image processing application 104 and algorithms can be executed with a processing system of the computing device 102 to implement embodiments of spatially coherent nearest neighbor fields.

The digital images 106 can include any type of images, such as two video frames that are consecutive or close together in time. Consecutive images will typically include subject matter that overlaps, such as the background of the images, and objects that may be moving in the foreground. The motion of an object, as represented by the displacement from one image to the next, may be a short distance in the images. Alternatively or in addition, the camera itself may move to capture a slightly different angle of the object, which gives the appearance of object motion from one image to the next. In some instances, an object may move a longer distance from one image to the next, such as when a car passes in front of the camera.

In the examples described herein to generate spatially coherent nearest neighbor fields, the digital images 106 are referenced as a first image 114 and a second image 116 that illustrate the motion of a dog jumping over an object. For example, in the first image 114, the dog is shown at the height of his jump over the object and, in the second image 116, the motion of the dog is shown to continue finishing the jump. The first and second digital images are described merely for illustrative purposes, and it should be noted that aspects of spatially coherent nearest neighbor fields can be expanded and applied to any number of digital images.

In embodiments, the image processing application 104 (and/or the algorithms of the image processing application) are described as creating, generating, determining, and/or modifying various digital image data 118 to create spatially coherent nearest neighbor fields. The details of the image processing application and/or algorithms interaction with the various digital image data are described and illustrated in examples of the first and second images 114, 116 with reference to FIGS. 2-6.

Generally, the nearest neighbor field algorithm 108 of the image processing application 104 is implemented to determine initial matching patches 120 of a nearest neighbor field for the first and second images 114, 116. An example of the initial matching patches 120 of a nearest neighbor field for the first and second images is described and illustrated with reference to FIGS. 2 and 3.

The optic flow and propagation algorithm 110 of the image processing application 104 is implemented to determine a motion field for each of the initial matching patches 120 (or recursively updated matching patches) based on matching patches motion data 122 of neighboring matching patches. In embodiments, this enforces a spatial coherency of each matching patch in the second image 116 with reference to respective matching patches in the first image 114. An example of a motion field for a matching patch determined based on the matching patches motion data 122 is described and illustrated with reference to FIG. 4.

The multi-resolution algorithm 112 of the image processing application 104 implements a multi-resolution iterative process to update each spatially coherent matching patch 124 based on overlapping grid regions of the matching patches that are evaluated for matching regions of the first and second images 114, 116. An example of overlapping grid regions of the spatially coherent matching patches 124 for the multi-resolution iterative process is described and illustrated with reference to FIG. 5.

Figure 2:
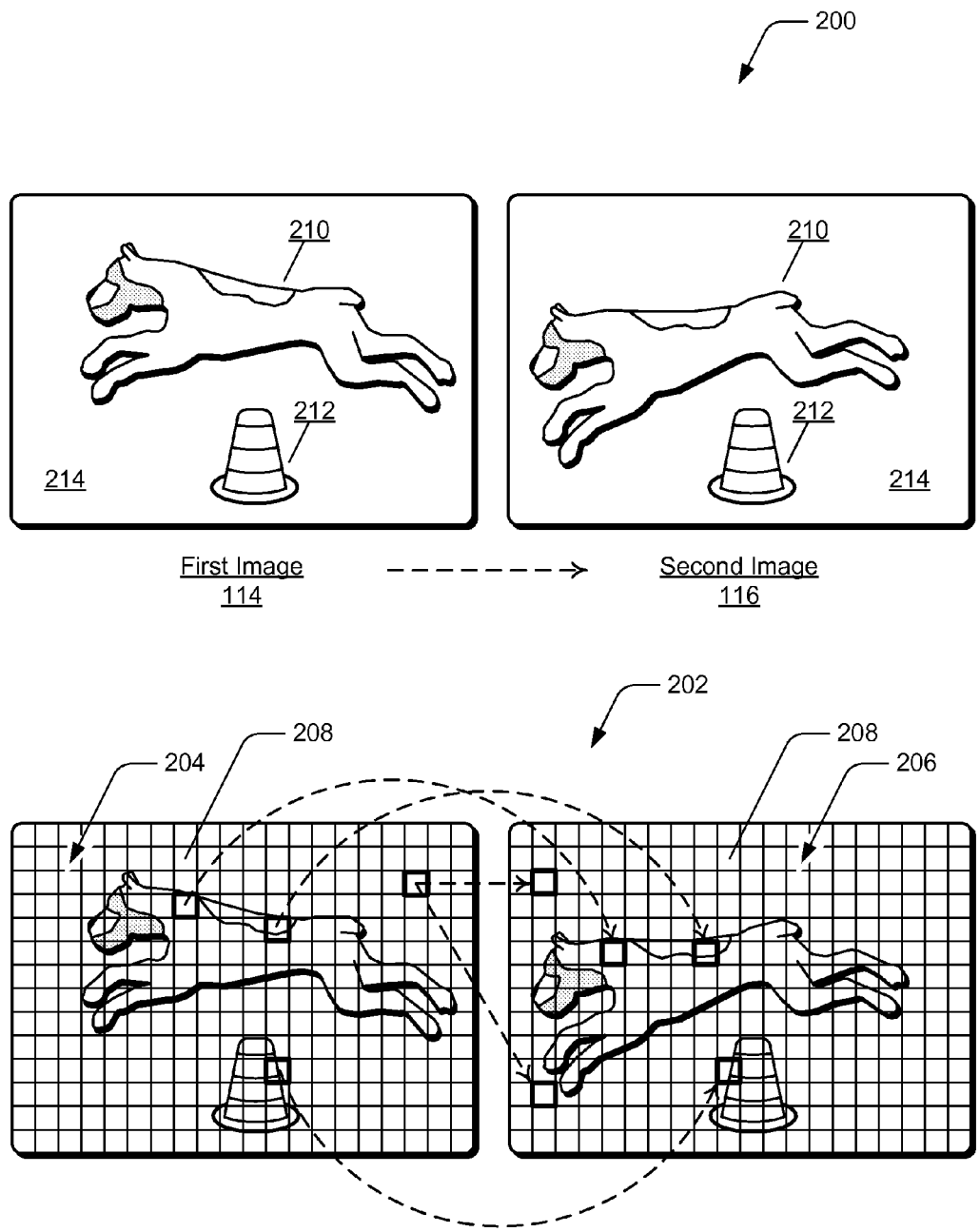
FIG. 2 illustrates an example of initial matching patches of a nearest neighbor field for digital images in accordance with one or more embodiments.

FIG. 2 illustrates an example 200 of initial matching patches 202 of a nearest neighbor field for the first image 114 and the second image 116 (described with reference to FIG. 1). The image processing application 104 creates an image grid 204 of the first image 114, and creates an image grid 206 of the second image 116. Each block or region of the image grids are representative of image patches 208, which can each be individual pixels, or larger regions that include multiple pixels. The nearest neighbor field algorithm 108 of the image processing application 104 is implemented to compare the image patches in the first image grid 204 and the second image grid 206 to determine the initial matching patches 202 at the image grid locations of the first and second images.

Patches of a digital image may be considered as each pixel of the image, or may be a larger region of the image that includes a grid of multiple pixels. A patch of several pixels will typically have more colors and other visual characteristics that make the patch less ambiguous, and likely easier to match for spatial coherency between images. The visual characteristics of a patch can include colors, shading, boundaries, and object features that can be detected to match patches for digital images. For example, a mostly black car may move as represented from one image to the next, and although many of the patches in the two images may be matching based on the black color of the car, the physically corresponding, spatially coherent patches may be different than the many other black colored patches due to shading, lighting, and/or other visual variations in the images, boundaries, and object shapes.

A relatively small patch (such as a 3×3 or 5×5 pixel region) can be used to determine object deformations to track object movement from one image to the next. While smaller patches may be better for accurate location determinations, such as for spatial coherency of an image patch from one image to another, larger patches can be utilized to avoid repetitive pattern matching. For example, a background of one common color, a wall, a fence, or other repetitive object pattern in the images will cause matching patches without spatial coherency from one image to the next. Although the smaller matching patches may be an accurate representation of the visual characteristics, the smaller matching patches may not physically correspond from one image to the next. Larger patches are likely to include visual characteristics of the images that are not repetitive, and the additional subject matter can be easier to match in the digital images.

The nearest neighbor field algorithm 108 of the image processing application 104 can be implemented with any number of various algorithms and techniques, including but not limited to, searching for the best matching patch in one image for every corresponding patch in the other image; utilizing a spatial constraint for a more efficient matching speed; and/or implementing the Principal Component Analysis or the Walsh-Hadamard Transform to compress the patches.

Examples of the initial matching patches 202 are shown in the image grids 204, 206 for the respective first and second images 114, 116. For example, two initial matching patches on the dog 210 in the second image 116 are matched to respective patches on the dog in the first image 114. Similarly, an initial matching patch that includes part of the object 212 (e.g., a cone that the dog jumps over) in the second image 116 is matched to a patch in the first image 114. The initial matching patches of the cone object illustrate that, although matching patches of the first and second images may include the visual subject matter and characteristics of each patch, the initial matching patches may not physically correspond from one image to the next. For example, the physically corresponding matching patch of the object in the second image 116 is to a patch on the other side of the object in the first image 114.

Additionally, two initial matching patches of the background 214 in the second image 116 are matched to a single patch in the first image 114. The initial matching patches of the background illustrate that patches in one image may be initially matched to any number of matching patches in the other image. Further, as with the matching patches of the cone object, the initial matching patches of the background are also not spatially coherent and do not physically correspond in location from one mage to the next.

Figure 3:
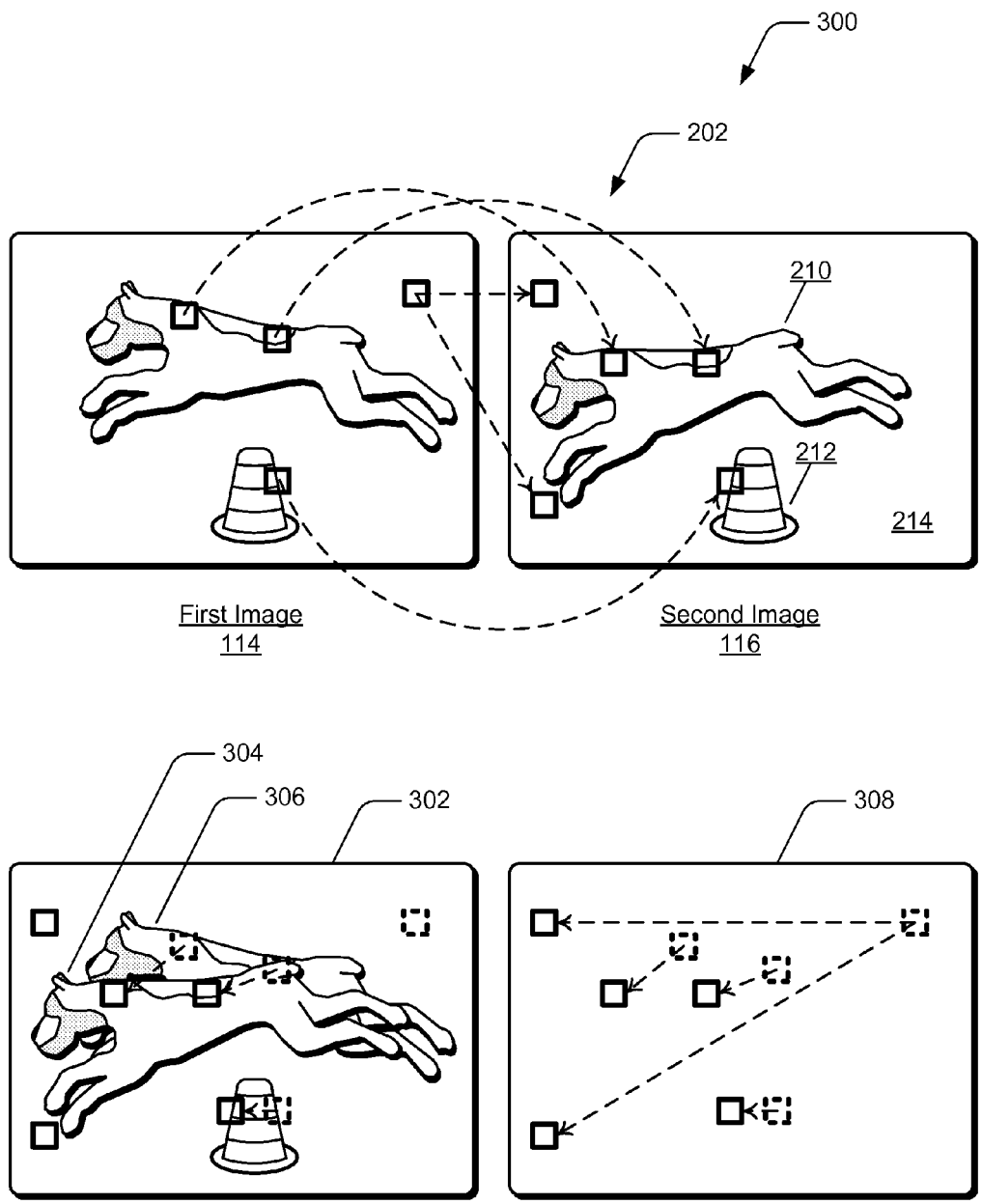
FIG. 3 further illustrates the example of the initial matching patches of a nearest neighbor field in accordance with one or more embodiments.

FIG. 3 further illustrates an example 300 of the initial matching patches 202 of the nearest neighbor field for the first image 114 and the second image 116, shown for illustrative purposes without the image grids as in FIG. 2. A superimposed image 302 shows the motion position 304 of the dog 210 in the second image 116 relative to the motion position 306 of the dog in the first image 114 to illustrate the displacement of the example initial matching patches. In the superimposed image 302, the matching patches of the first image 114 are shown as the dashed-line border patches and the matching patches of the second image 116 are shown as the solid-line border patches. Another example superimposed image 308 illustrates the displacement of the example initial matching patches for the first and second images with the objects (e.g., the dog and the cone) removed from the image. Again, the matching patches of the first image 114 are shown as the dashed-line border patches and the matching patches of the second image 116 are shown as the solid-line border patches.

Figure 4:
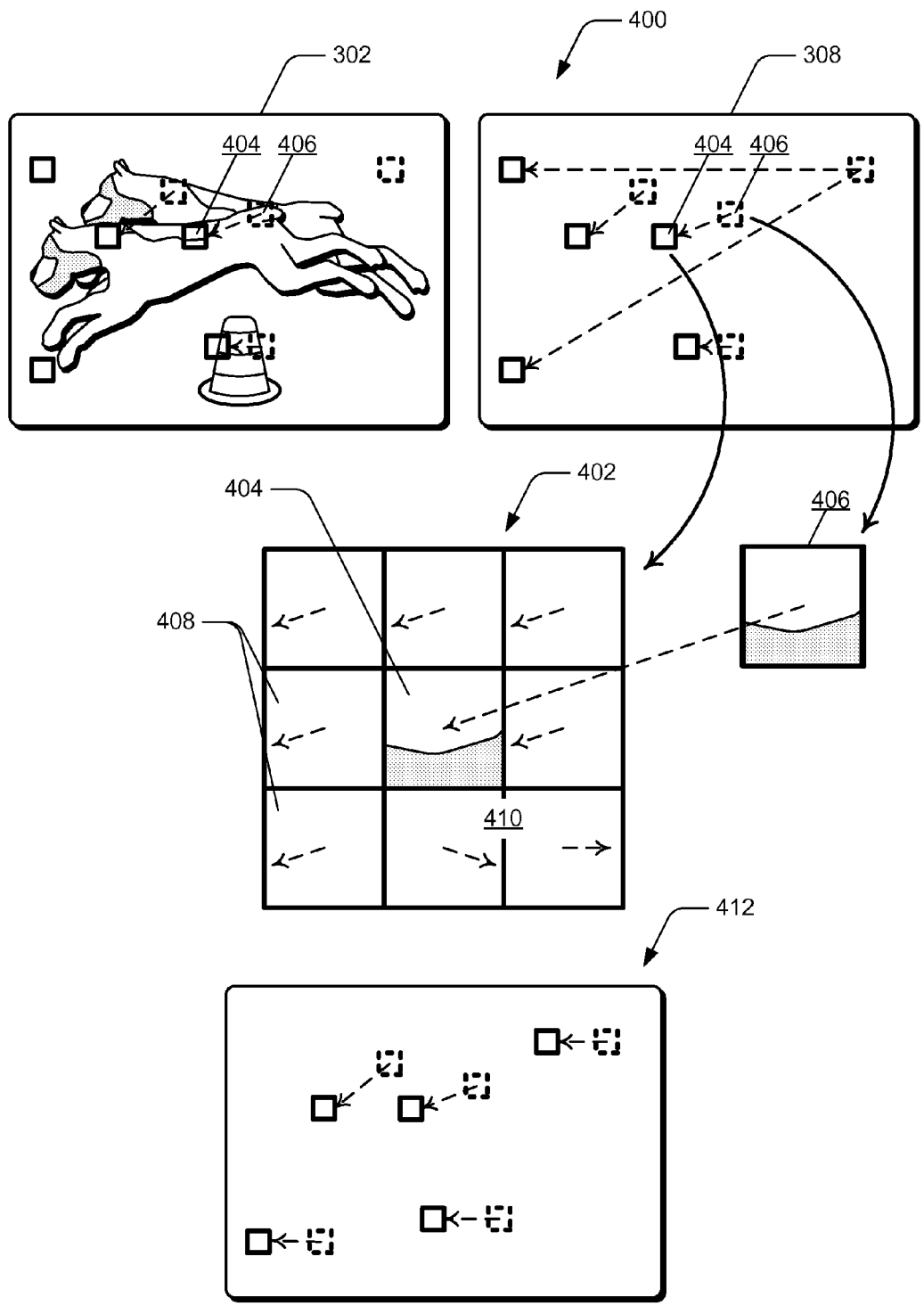
FIG. 4. illustrates an example of a motion field for each matching patch based on motion data of neighboring matching patches to create a spatially coherent nearest neighbor field in accordance with one or more embodiments.

FIG. 4 illustrates an example 400 of a motion field 402 for a matching patch based on the motion data of neighboring matching patches. In this example, the superimposed images 302 and 308 are shown again for reference. The optic flow and propagation algorithm 110 of the image processing application 104 is implemented to determine the motion field 402 for each matching patch based on the matching patches motion data 122 of neighboring matching patches. For example, a matching patch 404 from the second image 116 is matched to a respective patch 406 from the first image 114. The motion field 402 is determined for the matching patch 404 based on the matching patches motion data 122 of one or more neighboring matching patches 408 (i.e., the eight (8) neighboring patches around the matching patch 404).

The optic flow and propagation algorithm 110 is implemented to determine the motion field 402 for the matching patch 404 based on the respective neighboring matching patches 408 that have similar motion data 122, and disregard the neighboring matching patches that have dissimilar motion data. For example, the motion field is smoothed based on the six (6) neighboring matching patches 408 that have the similar motion data as the matching patch 404 (e.g., as indicated by the direction of the respective arrows shown for illustrative and discussion purposes). The optic flow and propagation algorithm 110 disregards the other two (2) neighboring matching patches at 410 that have dissimilar motion data, which likely indicates that these two initial matching patches in the second image 116 do not physically correspond to respective matching patches in the first image 114.

By smoothing the motion field 402 based on the neighboring matching patches 408 that have similar motion data and disregarding the neighboring matching patches at 410 that have dissimilar motion data, the optic flow and propagation algorithm 110 enforces the spatial coherency of each matching patch in the second image 116 with reference to respective matching patches in the first image 114. This iterative process propagates to smooth the motion field as applied for each matching patch in the digital images to generate a physical matching patch correspondence between the two images, and create a spatially coherent nearest neighbor field 412 that includes the spatially coherent matching patches. For example, the matching patches of the second image 116 (shown as the solid-line border patches) are spatially coherent with reference to the respective matching patches of the first image 114 (shown as the dashed-line border patches) in the spatially coherent nearest neighbor field 412.

Figure 5:
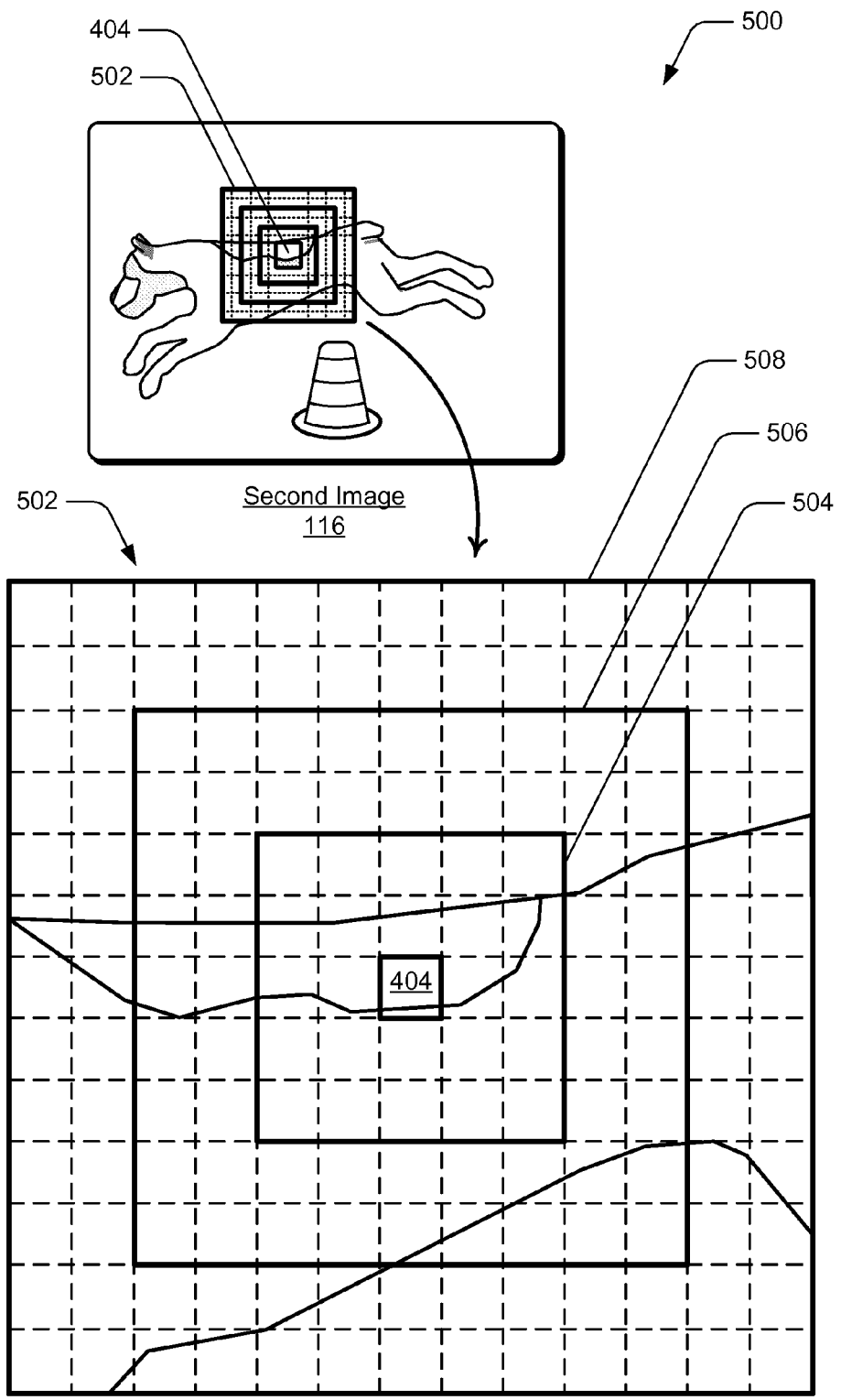
FIG. 5 illustrates overlapping grid regions of matching patches for a multi-resolution iterative process in accordance with one or more embodiments.

FIG. 5 illustrates an example 500 of overlapping grid regions 502 of matching patches for a multi-resolution iterative process. The multi-resolution algorithm 112 of the image processing application 104 implements the multi-resolution iterative process to update each of the spatially coherent matching patches 124 based on the overlapping grid regions 502 of the matching patches. In this example, the overlapping grid regions are created around the spatially coherent matching patch 404 from the second image 116, and include a small grid region 504, a large grid region 506, and a larger grid region 508. In implementations, the overlapping grid regions can be sequentially created with Gaussian smoothing and sub-sampling.

Each of the overlapping grid regions include some number of matching patches, and increasingly larger grid regions encompass smaller grid regions with reference to the matching patch that all of the overlapping grid regions encompass. For example, the small grid region 504 is a 5×5 region of patches; the large grid region 506 is a 9×9 region of patches that also encompasses the small grid region 504; and the larger grid region 508 is a 13×13 region of patches that also encompasses the large grid region 506 and the small grid region 504. Although three overlapping grid regions of the particular region sizes are illustrated and described, any number of grid regions of any designated region sizes can be implemented for the multi-resolution iterative process. In implementations, an image pyramid with images of different resolutions can be created, while keeping the patch size the same on each level of the pyramid, to effectively match different size areas at different levels of the pyramid.

The multi-resolution algorithm 112 evaluates each of the overlapping grid regions 502 for matching regions of the first and second images 114, 116. The overlapping grid regions can be evaluated based on a measured difference of the motion data 122 of respective matching patches that make up a grid region with reference to a larger matching region that encompasses the grid region and with reference to a smaller matching region that the grid region encompasses. The overlapping grid regions are also evaluated for larger matching regions of the first and second images down to smaller matching regions of the first and second images.

The multi-resolution algorithm 112 can determine region patch matches between the first and second images for each grid region of the overlapping grid regions based on a constraint of the multi-resolution iterative process that, for a larger matching region, the smaller matching regions within the larger matching region are considered to be matching. For example, if the larger grid region 508 of the second image 116 is determined to match a respective grid region of the first image 114, then both the large grid region 506 and the small grid region 504 that are encompassed by the larger region 508 are assumed to also match respective grid regions of the first image.

The multi-resolution iterative process is implemented as an iterative feedback to the optic flow and propagation algorithm 110 to further update and smooth the spatially coherent matching patches 124 of the first and second images 114, 116. The image processing application 104 is implemented to select an optimal, spatially coherent matching patch at each of the image grid locations of the first and second images. The optimal, spatially coherent matching patch at each of the image grid locations can be determined based on minimizing a local cost function that includes a data term and spatial coherent term, where the data term is the patch distance between matching patches at an image grid location of the first and second images.

In implementations, different patch distances can be utilized, such as the L2 distance between red, green, and blue (RGB) color densities, or with other robust measures. The spatial coherent term is a summation of a coherency of matching patches based on a distance of motion vectors between the neighboring matching patches. Again, different distances can be utilized, such as the L2 distance between two vectors. The distance may also be weighted according to whether there is an edge between two neighboring patches. Additionally, the cost function may be optimized by computing all of the functions for all of the possible matching patches, and then selecting the best matching patch.

Example method 600 is described with reference to FIG. 6 in accordance with one or more embodiments of spatially coherent nearest neighbor fields. Generally, any of the services, components, modules, methods, and operations described herein can be implemented using software, firmware, hardware (e.g., fixed logic circuitry), manual processing, or any combination thereof. Example methods may be described in the general context of executable instructions stored on computer-readable storage media that is local and/or remote to a computer processing system, and implementations can include software applications, programs, functions, and the like.

Figure 6:
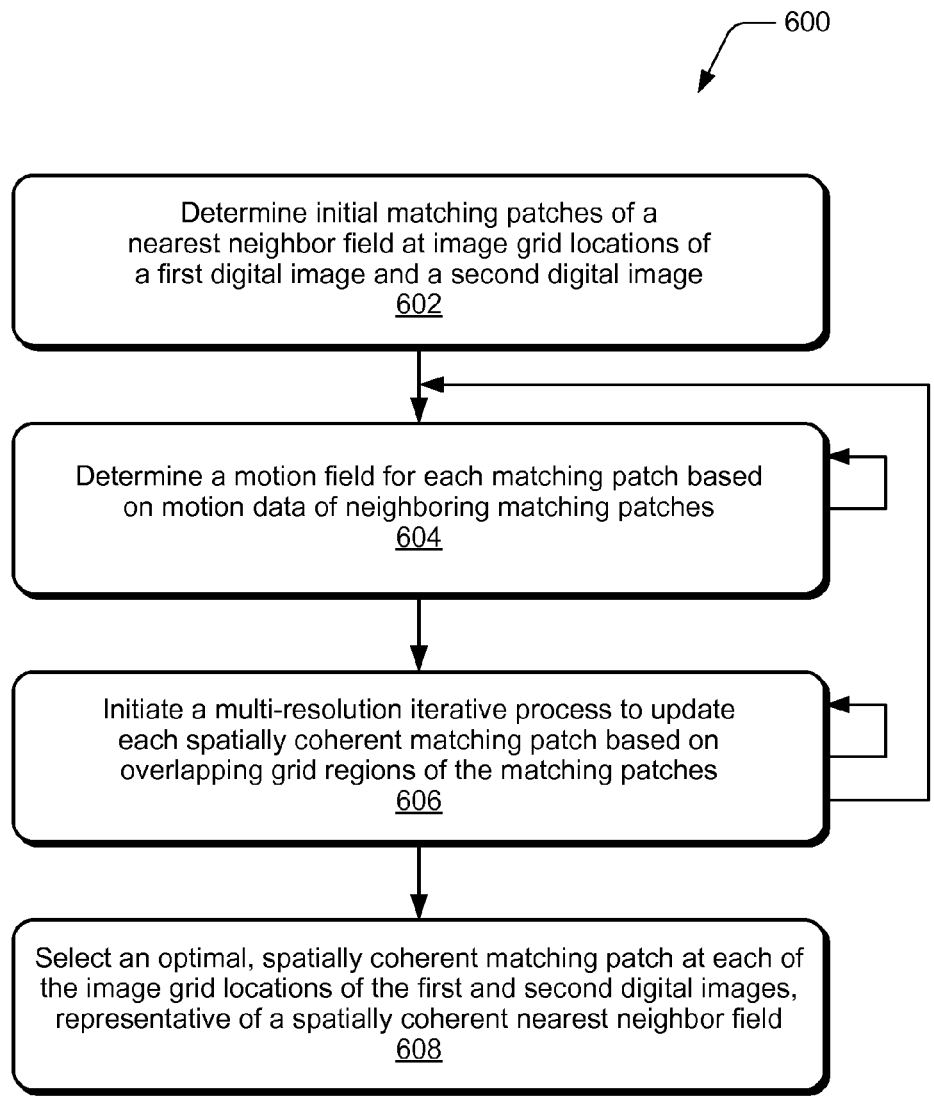
FIG. 6 illustrates example method(s) of spatially coherent nearest neighbor fields in accordance with one or more embodiments.

FIG. 6 illustrates example method(s) 600 of spatially coherent nearest neighbor fields, and is generally described with reference to an image processing application. The order in which the method is described is not intended to be construed as a limitation, and any number or combination of the method operations can be combined in any order to implement a method, or an alternate method.

At 602, initial matching patches are determined for a nearest neighbor field at image grid locations of a first digital image and a second digital image. For example, the nearest neighbor field algorithm 108 of the image processing application 104 at the computing device 102 (FIG. 1) compares image patches in the first image grid 204 and the second image grid 206 (FIG. 2) to determine the initial matching patches 120 (e.g., of the digital image data 118) and also shown in FIG. 2 as the initial matching patches 202 at the image grid locations of the first and second images 114, 116. Given the two digital images, the image processing application 104 creates the first image grid 204 of the first image 114 and creates the second image grid 206 of the second image 116.

At 604, a motion field is determined for each matching patch based on motion data of neighboring matching patches. For example, the optic flow and propagation algorithm 110 of the image processing application 104 determines the motion field 402 (FIG. 4) for each matching patch based on the matching patches motion data 122 of neighboring matching patches. As shown in FIG. 4, the motion field 402 is determined for the matching patch 404 from the second image 116 based on the motion data of the neighboring matching patches 408 (i.e., the eight (8) neighboring patches around the matching patch 404). Specifically, the motion field 402 is determined based on the respective neighboring matching patches 408 that have similar motion data, and the neighboring matching patches that have dissimilar motion data are disregarded.

For example, the motion field 402 is smoothed based on the six (6) neighboring matching patches 408 that have the similar motion data as the matching patch 404 (e.g., as indicated by the direction of the respective arrows), and the other two (2) neighboring matching patches at 410 that have dissimilar motion data are disregarded. This enforces the spatial coherency of each matching patch in the second image 116 with reference to respective matching patches in the first image 114. The motion field determinations for the matching patches is an iterative process that propagates to smooth the motion field as applied for each matching patch of the first and second images 114, 116 to generate a physical matching patch correspondence between the two images, and create the spatially coherent nearest neighbor field 412 that includes the spatially coherent matching patches.

At 606, a multi-resolution iterative process is initiated to update each spatially coherent matching patch based on overlapping grid regions of the matching patches. For example, the multi-resolution algorithm 112 of the image processing application 104 implements the multi-resolution iterative process to update each of the spatially coherent matching patches 124 based on the overlapping grid regions 502 (FIG. 5) of the matching patches. As shown in FIG. 5, the overlapping grid regions 502 are created around the spatially coherent matching patch 404 from the second image 116, and include a small grid region 504, a large grid region 506, and a larger grid region 508.

The multi-resolution algorithm 112 evaluates the overlapping grid regions for larger matching regions of the digital images down to smaller matching regions of the digital images, and the overlapping grid regions are determined based on a constraint that, for a larger matching region, the smaller matching regions within the larger matching region are considered to be matching. Alternatively, an image pyramid with images of different resolutions can be created, while keeping the patch size the same on each level of the pyramid, to effectively match different size areas at different levels of the pyramid. The multi-resolution algorithm 112 evaluates the different resolution images to determine matching regions. The multi-resolution iterative process is an iterative feedback to the optic flow and propagation algorithm 110 to further update and smooth the spatially coherent matching patches 124 of the first and second images 114, 116 (at 604) with the motion fields that are determined for each of the matching patches.

At 608, an optimal, spatially coherent matching patch is selected at each of the image grid locations of the first and second digital images, representative of a spatially coherent nearest neighbor field. For example, the image processing application 104 selects an optimal, spatially coherent matching patch 124 at each of the image grid locations of the first and second images 114, 116 based on the iterative interaction of determining the motion field for each matching patch (at 604) and the multi-resolution iterative process to update each spatially coherent matching patch (at 606). The optimal, spatially coherent matching patch at each of the image grid locations is also selected based on minimizing a local cost function that includes the data term and the spatial coherent term. The data term is the patch distance between matching patches at an image grid location of the first and second images, and the spatial coherent term is a summation of a coherency of matching patches based on a distance of motion vectors between neighboring matching patches.

Figure 7:
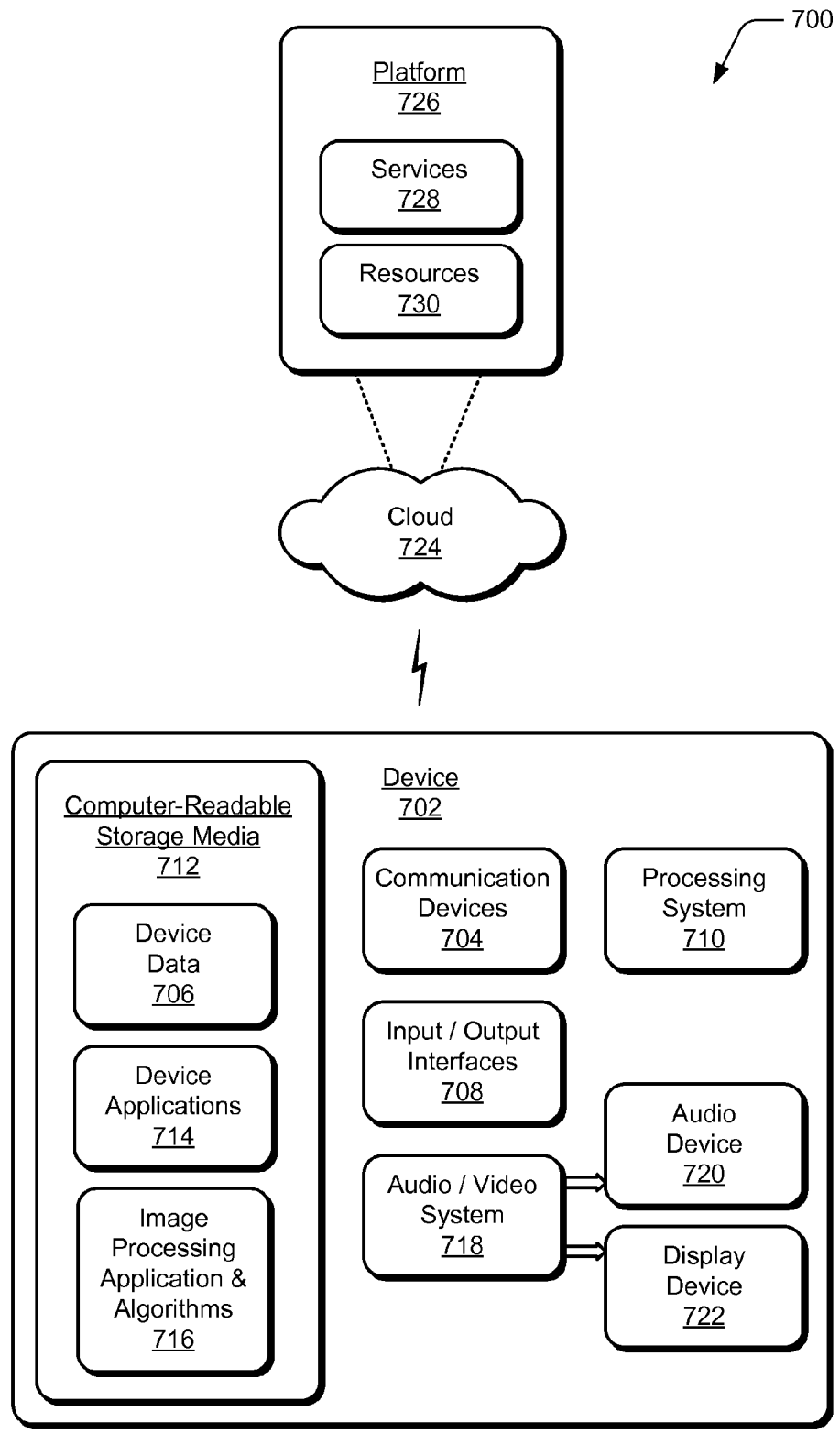
FIG. 7 illustrates an example system with an example device that can implement embodiments of spatially coherent nearest neighbor fields.

FIG. 7 illustrates an example system 700 that includes an example device 702, which can implement embodiments of spatially coherent nearest neighbor fields. The example device 702 can be implemented as any of the devices and/or servers described with reference to the previous FIGS. 1-6, such as any type of computer, server, processing device, client device, mobile device, tablet, computing, communication, and/or other type of device. For example, computing device 102 shown in FIG. 1 may be implemented as the example device 702.

The device 702 includes communication devices 704 that enable wired and/or wireless communication of device data 706, such as the digital images and the digital image data that is stored on the device. The communication devices 704 can also include transceivers for cellular phone communication and for network data communication.

The device 702 also includes input/output (I/O) interfaces 708, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 702 includes a processing system 710 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 702 may further include any type of a system bus or other data and command transfer system that couples the various components within the device. A system bus can include any one or combination of different bus structures and architectures, as well as control and data lines.

The device 702 also includes computer-readable storage media 712, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 712 provides storage of the device data 706 and various device applications 714, such as an operating system that is maintained as a software application with the computer-readable storage media and executed by the processing system 710. In this example, the device applications also include an image processing application and algorithms 716 that implement embodiments of spatially coherent nearest neighbor fields, such as when the example device 702 is implemented as the computing device 102 shown in FIG. 1. Examples of the image processing application and algorithms 716 are the image processing application 104, the nearest neighbor field algorithm 108, the optic flow and propagation algorithm 110, and the multi-resolution algorithm 112 at the computing device 102, as described with reference to FIGS. 1-6.

The device 702 also includes an audio and/or video system 718 that generates audio data for an audio device 720 and/or generates display data for a display device 722. The audio device and/or the display device include any devices that process, display, and/or otherwise render audio, video, display, and/or image data. In implementations, the audio device and/or the display device are integrated components of the example device 702. Alternatively, the audio device and/or the display device are external, peripheral components to the example device.

In embodiments, at least part of the techniques described for spatially coherent nearest neighbor fields may be implemented in a distributed system, such as over a "cloud" 724 in a platform 726. The cloud 724 includes and/or is representative of the platform 726 for services 728 and/or resources 730. For example, the services 728 and/or the resources 730 may include any of the image processing application and algorithms 716, as well as the digital images 106 and the digital image data 118 described with reference to FIG. 1.

The platform 726 abstracts underlying functionality of hardware, such as server devices (e.g., included in the services 728) and/or software resources (e.g., included as the resources 730), and connects the example device 702 with other devices, servers, etc. The resources 730 may also include applications and/or data that can be utilized while computer processing is executed on servers that are remote from the example device 702. Additionally, the services 728 and/or the resources 730 may facilitate subscriber network services, such as over the Internet, a cellular network, or Wi-Fi network. The platform 726 may also serve to abstract and scale resources to service a demand for the resources 730 that are implemented via the platform, such as in an interconnected device embodiment with functionality distributed throughout the system 700. For example, the functionality may be implemented in part at the example device 702 as well as via the platform 726 that abstracts the functionality of the cloud 724.

Although embodiments of spatially coherent nearest neighbor fields have been described in language specific to features and/or methods, the appended claims are not necessarily limited to the specific features or methods described. Rather, the specific features and methods are disclosed as example implementations of spatially coherent nearest neighbor fields.

The invention claimed is:

1. A method, comprising:
   determining initial matching patches at image grid locations of a first digital image and a second digital image;
   determining a motion field for each matching patch based on motion data of neighboring matching patches effective to enforce spatial coherency of each matching patch in the second digital image with reference to respective matching patches in the first digital image;
   initiating a multi-resolution iterative process to update each spatially coherent matching patch based on overlapping grid regions of the matching patches that are evaluated for larger matching regions of the first and second digital images down to smaller matching regions of the first and second digital images; and
   determining an optimal, spatially coherent matching patch at each of the image grid locations based on minimizing a local cost function that includes a data term and a spatial coherent term, the data term comprising a patch distance between matching patches at an image grid location of the first and second digital images, and the spatial coherent term comprising a summation of a coherency of matching patches based on a distance of motion vectors between neighboring matching patches.

2. A method as recited in claim 1, further comprising:
   creating a first image grid of the first digital image;
   creating a second image grid of the second digital image; and
   wherein said determining the initial matching patches comprises comparing patches in the first image grid and the second image grid to determine the initial matching patches of a nearest neighbor field.

3. A method as recited in claim 1, further comprising:
   enforcing the spatial coherency of each matching patch based on the neighboring matching patches that have similar motion data, and neighboring matching patches that have dissimilar motion data are disregarded.

4. A method as recited in claim 1, wherein the multi-resolution iterative process comprises:
   determining region patch matches between the first and second digital images for each grid region of the overlapping grid regions based on a constraint that, for a larger matching region, the smaller matching regions within the larger matching region are considered to be matching.

5. A method as recited in claim 1, further comprising:
   selecting the optimal, spatially coherent matching patch at each of the image grid locations of the first and second digital images based on iterative interaction of said determining the motion field for each matching patch and the multi-resolution iterative process to update each spatially coherent matching patch.

6. A computing device, comprising:
   a memory configured to maintain digital images;
   a processing system to implement an image processing application that is configured to:
   determine initial matching patches at image grid locations of a first digital image and a second digital image;
   enforce spatial coherency of each matching patch in the second digital image with reference to respective matching patches in the first digital image based on motion data of neighboring matching patches;
   initiate a multi-resolution iterative process to update each spatially coherent matching patch based on overlapping grid regions of the matching patches that are evaluated for matching regions of the first and second digital images; and determine an optimal, spatially coherent matching patch at each of the image grid locations based on minimizing a local cost function that includes a data term and a spatial coherent term, the data term comprising a patch distance between matching patches at an image grid location of the first and second digital images, and the spatial coherent term comprising a summation of a coherency of matching patches based on a distance of motion vectors between the neighboring matching patches.

7. A computing device as recited in claim 6, wherein the optimal, spatially coherent matching patch at each of the image grid locations is based on iterative interaction to said enforce the spatial coherency of each matching patch and the multi-resolution iterative process to update each spatially coherent matching patch.

8. A computing device as recited in claim 6, wherein the image processing application is configured to:
create a first image grid of the first digital image;
create a second image grid of the second digital image; and
compare patches in the first image grid and the second image grid to determine the initial matching patches of a nearest neighbor field.

9. A computing device as recited in claim 6, wherein the image processing application is configured to said enforce the spatial coherency of each matching patch based on the neighboring matching patches that have similar motion data, and disregard neighboring matching patches that have dissimilar motion data.

10. A computing device as recited in claim 6, wherein the image processing application is configured to determine a motion field for each matching patch based on motion data of neighboring matching patches effective to enforce the spatial coherency of each matching patch in the second digital image with reference to respective matching patches in the first digital image.

11. A computing device as recited in claim 10, wherein the image processing application comprises:
a nearest neighbor field algorithm configured to said determine the initial matching patches;
an optic flow and propagation algorithm configured to determine the motion field based on the motion data of the neighboring matching patches for each matching patch effective to enforce the spatial coherency of each matching patch; and
a multi-resolution algorithm configured to implement the multi-resolution iterative process to update each spatially coherent matching patch.

12. A computing device as recited in claim 6, wherein the image processing application is configured to evaluate the overlapping grid regions of the multi-resolution iterative process for larger matching regions of the first and second digital images down to smaller matching regions of the first and second digital images.

13. A computing device as recited in claim 12, wherein the image processing application is configured to determine region patch matches between the first and second digital images for each grid region of the overlapping grid regions based on a constraint of the multi-resolution iterative process that, for a larger matching region, the smaller matching regions within the larger matching region are considered to be matching.

14. A computing device as recited in claim 6, wherein the image processing application is configured to select the optimal, spatially coherent matching patch at each of the image grid locations of the first and second digital images.

15. One or more computer-readable storage memory devices comprising algorithms stored as instructions that are executable and, responsive to execution of the instructions at a computing device, the computing device performs operations of the algorithms comprising to:
determine matching patches in an initial nearest neighbor field at image grid locations of a first digital image and a second digital image;
determine a motion field for each matching patch in the initial nearest neighbor field based on motion data of neighboring matching patches effective to enforce spatial coherency of each matching patch in the second digital image with reference to respective matching patches in the first digital image;
initiate a multi-resolution iterative process to update each spatially coherent matching patch based on overlapping grid regions of the matching patches that are evaluated for larger matching regions of the first and second digital images down to smaller matching regions of the first and second digital images; and
determine an optimal, spatially coherent matching patch at each of the image grid locations based on minimizing a local cost function that includes a data term and a spatial coherent term, the data term comprising a patch distance between matching patches at an image grid location of the first and second digital images, and the spatial coherent term comprising a summation of a coherency of matching patches based on a distance of motion vectors between neighboring matching patches.

16. One or more computer-readable storage memory devices as recited in claim 15, wherein the computing device performs the operations of the algorithms further comprising to:
create a first image grid of the first digital image;
create a second image grid of the second digital image; and
compare patches in the first image grid and the second image grid to determine the initial matching patches of a nearest neighbor field.

17. One or more computer-readable storage memory devices as recited in claim 15, wherein the computing device performs the operations of the algorithms further comprising to select the optimal, spatially coherent matching patch at each of the image grid locations of the first and second digital images based on iterative interaction to said determine the motion field for each matching patch and the multi-resolution iterative process to update each spatially coherent matching patch.

18. One or more computer-readable storage memory devices as recited in claim 15, wherein the computing device performs the operations of the algorithms further comprising to enforce the spatial coherency of each matching patch based on neighboring matching patches that have similar motion data, and neighboring matching patches that have dissimilar motion data are disregarded.

19. One or more computer-readable storage memory devices as recited in claim 15, wherein the computing device performs the operations of the algorithms further comprising to determine region patch matches between the first and second digital images for each grid region of the overlapping grid regions based on a constraint of the multi resolution iterative process that, for a larger matching region, the smaller matching regions within the larger matching region are considered to be matching.

20. One or more computer-readable storage memory devices as recited in claim 15, wherein the computing device performs the operations of the algorithms further comprising to evaluate the overlapping grid regions of the multi-resolution iterative process for larger matching regions of the first and second digital images down to smaller matching regions of the first and second digital images.

* * * * *